(12) United States Patent
Ilic et al.

(10) Patent No.: US 8,291,390 B2
(45) Date of Patent: Oct. 16, 2012

(54) TESTING A GRAPHICAL PROGRAM INTENDED FOR A PROGRAMMABLE HARDWARE ELEMENT

(75) Inventors: Kosta Ilic, Austin, TX (US); Dustyn K. Blasig, San Diego, CA (US)

(73) Assignee: National Instruments Corporation, Austin, TX (US)

( * ) Notice: Subject to any disclaimer, the term of this patent is extended or adjusted under 35 U.S.C. 154(b) by 1112 days.

(21) Appl. No.: 12/182,863

(22) Filed: Jul. 30, 2008

(65) Prior Publication Data

US 2010/0031231 A1 Feb. 4, 2010

(51) Int. Cl.
G06F 9/44 (2006.01)
(52) U.S. Cl. ........................................ 717/135
(58) Field of Classification Search .................. None
See application file for complete search history.

(56) References Cited

U.S. PATENT DOCUMENTS

| | | | |
|---|---|---|---|
| 4,901,221 A | 2/1990 | Kodosky et al. |
| 4,914,568 A | 4/1990 | Kodosky et al. |
| 5,309,556 A | 5/1994 | Sismilich |
| 5,481,741 A | 1/1996 | McKaskle et al. |
| 5,493,507 A | 2/1996 | Shinde et al. |
| 5,497,498 A | 3/1996 | Taylor |
| 5,535,342 A | 7/1996 | Taylor |
| 5,541,849 A | 7/1996 | Rostoker et al. |
| 5,555,201 A | 9/1996 | Dangelo et al. |
| 5,583,749 A | 12/1996 | Tredennick et al. |
| 5,603,043 A | 2/1997 | Taylor et al. |
| 5,638,299 A | 6/1997 | Miller |
| 5,652,875 A | 7/1997 | Taylor |
| 5,652,909 A | 7/1997 | Kodosky |
| 5,684,980 A | 11/1997 | Casselman |
| 5,732,277 A | 3/1998 | Kodosky et al. |
| 5,737,235 A | 4/1998 | Kean et al. |
| 6,009,256 A | 12/1999 | Tseng et al. |

(Continued)

FOREIGN PATENT DOCUMENTS

DE  4205524  8/1992

(Continued)

OTHER PUBLICATIONS

"Press Release, i-Logix Signs Reseller Agreement for Virtual Prototypes", Inc.'s VAPS Product Line, Feb. 11, 1997, 2 pages.

(Continued)

*Primary Examiner* — Philip Wang
(74) *Attorney, Agent, or Firm* — Meyertons Hood Kivlin Kowert & Goetzel, P.C.; Jeffrey C. Hood; Joel L. Stevens

(57) ABSTRACT

Testing a first graphical program intended for implementation on a programmable hardware element. The first graphical program may be stored. The first graphical program may include a first plurality of nodes connected by lines which visually specify first functionality. The first graphical program may be intended for implementation by the programmable hardware element. A second graphical program may be stored which visually specifies testing functionality for the first graphical program. The second graphical program may be executable by a host computer to simulate input to the programmable hardware element when configured by the first graphical program. The first graphical program and the second graphical program may be executed (e.g., by a host computer) to test the first functionality when implemented by the programmable hardware element. During execution, simulated outputs may be monitored.

20 Claims, 14 Drawing Sheets

U.S. PATENT DOCUMENTS

| | | | |
|---|---|---|---|
| 6,052,524 A | 4/2000 | Pauna | |
| 6,064,409 A | 5/2000 | Thomsen et al. | |
| 6,112,020 A | 8/2000 | Wright | |
| 6,118,938 A | 9/2000 | Lawman et al. | |
| 6,173,438 B1 | 1/2001 | Kodosky et al. | |
| 6,219,628 B1 | 4/2001 | Kodosky et al. | |
| 6,226,776 B1 | 5/2001 | Panchul et al. | |
| 6,230,307 B1 | 5/2001 | Davis et al. | |
| 6,247,147 B1 | 6/2001 | Beenstra et al. | |
| 6,282,627 B1 | 8/2001 | Wong et al. | |
| 6,532,573 B1 | 3/2003 | Kurosaka | |
| 6,539,438 B1 | 3/2003 | Ledzius et al. | |
| 6,571,373 B1 | 5/2003 | Devins et al. | |
| 6,584,601 B1 | 6/2003 | Kodosky et al. | |
| 6,802,026 B1 | 10/2004 | Patterson et al. | |
| 7,024,660 B2 * | 4/2006 | Andrade et al. | 717/124 |
| 7,302,675 B2 | 11/2007 | Rogers et al. | |
| 7,958,488 B2 * | 6/2011 | Cifra | 717/106 |
| 2001/0020291 A1 | 9/2001 | Kudukoli et al. | |
| 2003/0046663 A1 * | 3/2003 | Rogers et al. | 717/125 |
| 2003/0192032 A1 * | 10/2003 | Andrade et al. | 717/124 |
| 2005/0268288 A1 * | 12/2005 | Nattinger | 717/125 |
| 2007/0044078 A1 * | 2/2007 | Cifra | 717/135 |

FOREIGN PATENT DOCUMENTS

| | | |
|---|---|---|
| DE | 69232869 | 9/2003 |
| WO | 9410627 | 5/1994 |
| WO | 9415311 | 7/1994 |

OTHER PUBLICATIONS

Press Release, "i-Logix Introduces Rhapsody, Object-Oriented analysis, Design and Implementation Tool", Feb. 10, 1997, 2 pages.

"Statemate/C Product Overview", 1995, 4 pages.

Press Release, "i-Logix and Integrated Systems Link Statemate MAGNUM and MATRIX AutoCode" Jan. 3, 1997, 2 pages.

Press Release, "i-Logix and Wind River unveil Industry's First Rapid Prototyping Solution for Testing Embedded Systems at ESC West in San Jose", Sep. 17, 1996, 3 pages.

Press Release, "i-Logix Inc. Endorses Unified Modeling Language", Jan. 16, 1997, 1 page.

Levy, M., "DSP Design Tools Target FPGAs" www.reed-electronics.com/ednmag/archives/1996/062096/13df2.htm, Jun. 20, 1996.

Heimdahl, M.P.E., Keenan, D.J., "Generating Code from Hierarchical State-Based Requirements," Proceedings of IEEE International Symposium on Requirements Engineering (RE'97), Jan. 1997.

Integrated Systems, Inc., "MATRIXx Product Family Technical Specifications," Product Manual, Copyright 1995.

Pauer, E.K., "Multiprocessor System Development for High Performance Signal Processing Applications," Proceedings of the 1997 IEEE Int. Workshop on Rapid System Prototyping (RSP), Copyright 1997.

Drusinsky, D., "Extended State Diagrams and Reactive Systems," Dr. Dobb's Journal, Oct. 1994.

Chen, X., Ling, X., Amano, H., "Software Environment for WASMII: a Data Driven Machine with a Virtual Hardware," Proceedings of 4.sup.th Workshop on Field-Programmable Logic and Applications (FPL '94), pp. 208-219, Springer Verlag, Sep. 1994.

Levi, et al., "GeneticFPGA: Evolving Stable Circuits on Mainstream FPGA Devices"; Proceedings of the First NASA/ DoD Workshop on Evolvable Hardware; Jul. 19-21, 1999; IEEE; 6 pages.

Patterson; "High Performance DES Encryption in Virtex and FPGAs using JBits"; 2000 IEEE Symposium on Field-Programmable Custom Computing Machines; 2000; pp. 113-121.

Scalera, et al.; "A Run-Time Reconfigurable Plug-In for the Winamp MP3 Player"; 2000 IEEE Symposium on Field-Programmable Custom Computing Machines; 2000; pp. 319-320.

Xie, et al.; "An SBus Monitor Board"; Proceedings of the Third International ACM Symposium on Field-Programmable Gay Arrays; 1995; pp. 160-167.

Edwards, et al., "Software acceleration using programmable hardware devices," IEEE Proceedings: Computers and Digital Techniques, vol. 143, No. 1, Jan. 1996, pp. 55-63.

Leeser, et al, "High Level Synthesis and Generating FPGAs with the BEDROC System," Journal of VLSI Signal Processing, vol. 6, No. 2, Aug. 1993, pp. 191-214.

Ade, M; Lauwereins, R; Peperstraete, J.A.; "Hardware-Software Codesign with GRAPE", Proceedings of the Sixth IEEE International Workshop on Rapid System Prototyping, pp. 40-47, Jun. 9, 1995.

Lauwereins, R; Engels, M; Ade, M; Peperstraette, J; "Grape-II: A System-Level Prototyping Environment for DSP Applications", Computer, vol. 28, Issue 2, pp. 35-43, Feb. 1995.

Lysaght, P; Stockwood, J; "A Simulation Tool for Dynamically Reconfigurable Field Programmable Gate Arrays", IEEE Transactions on Very Large Scale Integration Systems, vol. 4, Issue 3, pp. 381-390, Sep. 1996.

De Coster, "Grape-II: An Introduction" [online]. Automatic Control and Computer Architectures Department. Katholieke Universiteit Leuven, Belgium, Feb. 22, 1996 [retrieved Oct. 6, 1999] Retrieved from the Internet @ http://www.esat.kuleuven.ac.be/acca.

Wenban et al., "A Software Development System for FPGA-based Data Acquisition Systems", Proceedings of the IEEE Symposium on FPGAs for Custom Computing Machines, pp. 28-37, Apr. 1996.

Petronino et al., "An FPGA-based Data Acquisition System for a 95 GHz. W-band Radar", IEEE International Conference on Acoustics, Speech and Signal Processing, vol. 5, pp. 4105-4108, Apr. 1997.

Boulay et al., "A High Throughput Controller for a 256-Channel Cardiac Potential Overlapping System", Canadian Conference on Electrical and Computer Engineering, vol. 1, pp. 539-542, Sep. 1995.

Collamati et al. "Induction Machine stator Fault On-line Diagnosis Based on LabVIEW Environment", Mediterranean Electrotechnical Conference, vol. 1, p. 495-498, May 1996.

Spoelder et al., "Virtual Instrumentation: A Survey of Standards and Their Interrelation", Proc. IEEE Instr. and Measurement Tech. Conf., vol. 1, pp. 676-681, May 1997.

Srinivasan et al., "LabVIEW program Design for On-Line Data Acquisition and Predictive Maintenance", Proc. of the 30th Southeastern Symp. On System Theory, pp. 520-524, Mar. 1998.

Wahidanabanu et al., "Virtual Instrumentation with Graphical Programming for Enhanced Detection and Monitoring of Partial Discharges", Proc. Electrical Insulation Conf. 1997, pp. 291-296, Sep. 1997.

"Choosing Block-Diagram Tools for DSP Design", http://www.bdti.com/articles/info.sub.--dspmt95blockdiagram.htm, May 9, 2003, pp. 1-7.

"Real-Time Workshop for Use with Simulink", User's Guide, May 1994, 229 pages.

"Guide to Rapid Prototyping with Simulink", Real-Time Workshop and dSPACE, 1995, 16 pages.

"Real-Time Interface to Simulink", RTI 30, User's Guide, 1995, 125 pages.

Kevin J Gorman and Kourosh J. Rahnamai, "Real-Time Data Acquisition and Controls Using MatLAB", 1995, 4 pages.

"SPW—MatLAB Co-Simulation Interface Product Data Sheet", 1996, 2 pages.

"Signal Processing WorkSystem", MatLAB Interface User's Guide, Oct. 1995, 72 pages.

"Alta Group of Cadence Design Systems, Inc.", 1995, 34 pages.

"Code Generation System Product Data Sheet", 1994, 8 pages.

"SPW/CGS Porting Kits Product Data Sheet", Nov. 1994, 2 pages.

"MultiProx for SPW Product Data Sheet", Aug. 1994, 4 pages.

"DSP ProCoder for SPW Product Data Sheet", Nov. 1994, 4 pages.

"Xanalog Corporation Sales Manual", Jan. 1987, 8 pages.

"Available XA-1000 Literature and Its Use", 1986, 2 pages.

"Xanalog, XA-1000 Programming ICONS", 1986, 15 pages.

"Xanalog's CAE System: The Fastest AT Alive", Mass High Tech, vol. 4, No. 22, Aug. 1988, 1 page.

"Xanalog—The Computer Aided Engineering Workstation Comes to Simulation", Simulation vol. 47, No. 1, Jul. 1986, 3 pages.

"Xanalog RT Real Time Analog and Digital I/O", Oct. 1990, 4 pages.

"Xanalog/SC+", Sep. 1990, 4 pages.

"Xanalog Specializing in Workstations for Continuous Dynamic Simulation", 1987, 24 pages.

"Xanalog Real-Time User Guide", 1994, 28 pages.

Lee et al., "Gabriel: A Design Environment for Programmable DSPs", Nov. 7, 1988, 13 pages.
Lee et al., "A Design Tool for Hardware and Software for Multiprocessor DSP Systems", May 1989, 4 pages.
"Gabriel 0.7 Overview", 1990, 5 pages.
Joseph T. Buck and Edward A. Lee, "Scheduling Dynamic Dataflow Graphs with Bounded Memory Using the Token Flow Model", http://www.synopsys.com/, 1995, 4 pages.
Edward A. Lee, "Design Methodology for DSP", 1992, 4 pages.
Pino et al., "Interface Synthesis in Heterogeneous System-Level DSP Design Tools", May 1996, 4 pages.
Jose Luis Pino, Master's Report, "Software Synthesis for Single-Processor DSP Systems Using Ptolemy", May 1993, 48 pages.
Asawaree Kalavade and Edward A. Lee, "A Hardware-Software Codesign Methodology for DSP Applications", 1993, 12 pages.
Pino et al., "Automatic Code Generation for Heterogeneous Multiprocessors", 1994, 4 pages.
"Tool Chest continues to Grow", Electronic Engineering Times, Dec. 15, 1995, 2 pages.
Pino et al., "Mapping Multiple Independent Syunchronous dataflow Graphs onto Heterogeneous Multiprocessors", Oct. 1994, 6 pages.
Asawaree Kalavade and Edward A. Lee, "Hardware/Software Co-Design Using Ptolemy—A Case Study", Sep. 1992, 18 pages.
Pino et al, "Software Synthesis for DSP Using Ptolemy", 1995, 15 pages.
"vol. 1—Ptolemy 0.7 User's Manual", 1997, 532 pages.
"i-Logix Product Overview", 1996, 52 pages.
"Press Release, i-Logix Statemate MAGNUM Supports PCs", Jan. 31, 1997, 2 pages.

* cited by examiner

TESTING A GRAPHICAL PROGRAM INTENDED FOR A PROGRAMMABLE HARDWARE ELEMENT

FIELD OF THE INVENTION

The present invention relates to the field of graphical programming, and more particularly to a system and method for testing a graphical program intended for implementation by a programmable hardware element.

DESCRIPTION OF THE RELATED ART

Graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

Additionally, programmable hardware elements (e.g., programmable gate arrays, such as field programmable gate arrays (FPGAs)) have become increasingly popular. It is possible for a user to create a graphical program and have a hardware description file (e.g., a VHDL file) created for programming a programmable hardware element to implement the functionality of the graphical program. However, the creation of the hardware description file and programming of the programmable hardware element can take a long time. Accordingly, improved methods for testing graphical programs before they are implemented on programmable hardware elements are desired.

SUMMARY OF THE INVENTION

Various embodiments are presented of a system and method for testing a first graphical program intended for deployment on a programmable hardware element.

The first graphical program may be stored. The first graphical program may include a first plurality of nodes connected by lines which visually specify first functionality. As indicated above, the first graphical program may be intended for implementation by the programmable hardware element.

A second graphical program may be stored which includes a second plurality of nodes connected by lines. The second graphical program may visually specify testing functionality for the first graphical program. The second graphical program may be executable by a host computer to simulate input to the programmable hardware element when configured by the first graphical program. In one embodiment, only a single second graphical program may be used; however, in some embodiments, a plurality of second graphical programs may be used to test the first functionality of the first graphical program. Additionally, in some embodiments, the second graphical program may be created or automatically generated based on the first graphical program. Alternatively, or additionally, a template may be automatically generated based on the first graphical program and the user may provide further input to fully specify the second graphical program.

The first graphical program and the second graphical program may be executed (e.g., by a host computer) to test the first functionality when implemented by the programmable hardware element. In some embodiments, the output of the first graphical program may be monitored during the execution of the first and second graphical programs. For example, the output data may be logged into one or more data files. Additionally, or alternatively, the output may be analyzed (e.g., in a live mode or on the logged data). In one embodiment, one or more alerts may be displayed on a display (e.g., of the host computer), e.g., during execution or after analysis of logged data has occurred, among other possible times.

A hardware description file may be created based on the first graphical program, and the programmable hardware element may be programmed using the hardware description file. Accordingly, the programmable hardware element may be operated and may implement the first functionality.

BRIEF DESCRIPTION OF THE DRAWINGS

A better understanding of the present invention can be obtained when the following detailed description of the preferred embodiment is considered in conjunction with the following drawings, in which.

Figure 1A:
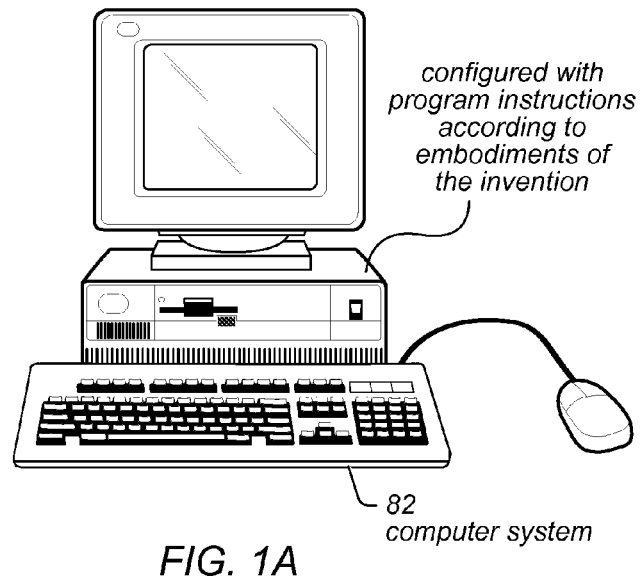
FIG. 1A illustrates a computer system operable to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment", issued on Jan. 2, 1996.

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (U.S. Ser. No. 09/745,023) titled "System and Method for Programmatically Generating a Graphical Program in Response to Program Information," filed Dec. 20, 2000.

U.S. Pat. No. 7,024,660 titled "Debugging a Program Intended to Execute on a Reconfigurable Device Using a Test Feed-Through Configuration", filed Oct. 29, 2001.

U.S. Pat. No. 7,302,675, titled "System and Method for Analyzing a Graphical Program Using Debugging Graphical Programs", filed on Aug. 28, 2001.

U.S. Pat. No. 6,584,601, titled "System and Method for Converting Graphical Programs into Hardware Implementations which Utilize Probe Insertion", filed Feb. 7, 2000.

U.S. Pat. No. 5,652,909, titled "Method and Apparatus for Providing Autoprobe Features in a Graphical Data Flow Diagram", filed Jun. 7, 1995.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include LabVIEW®, Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Graphical Data Flow Program (or Graphical Data Flow Diagram)—A graphical program or diagram comprising a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

FIG. 1A—Computer System

FIG. 1A illustrates a computer system 82 operable to execute a first graphical program intended for implementation on a programmable hardware element. One embodiment of a method for creating a second graphical program operable to test the first graphical program is described below.

As shown in FIG. 1A, the computer system 82 may include a display device operable to display the graphical program as the first and/or second graphical program is created and/or executed. The display device may also be operable to display a graphical user interface or front panel of the first and/or second graphical program during execution of the graphical program. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more graphical programs which are executable to perform the methods described herein. Additionally, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

Figure 1B:
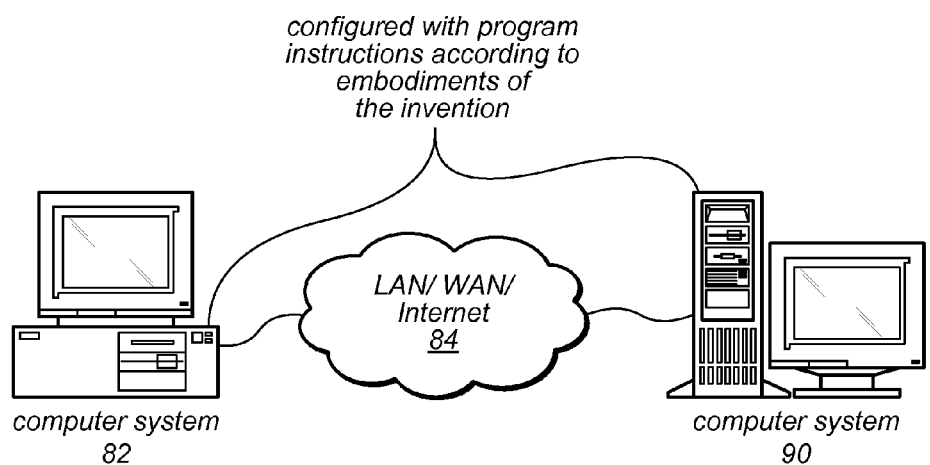
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device coupled to the computer system 82. The device may be a reconfigurable device and may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system.

In one embodiment, as described below, a first graphical program may be tested using a second graphical program, and may be converted to a hardware configuration program. The hardware configuration program may be used to configure the reconfigurable device, e.g., a programmable hardware element in the reconfigurable device. Exemplary devices are described below.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
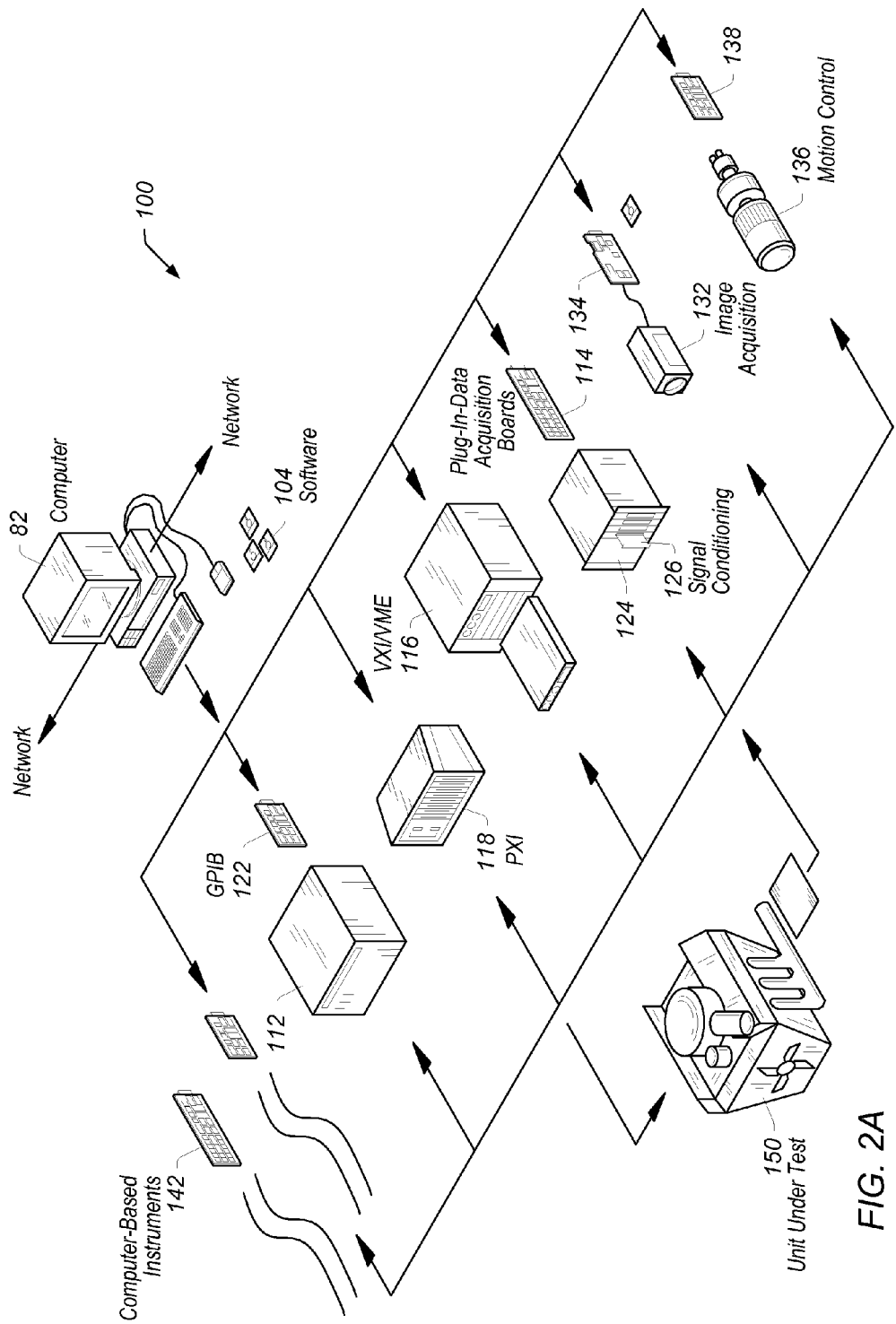
FIG. 2A illustrates an instrumentation control system according to one embodiment of the invention.
Figure 2B:
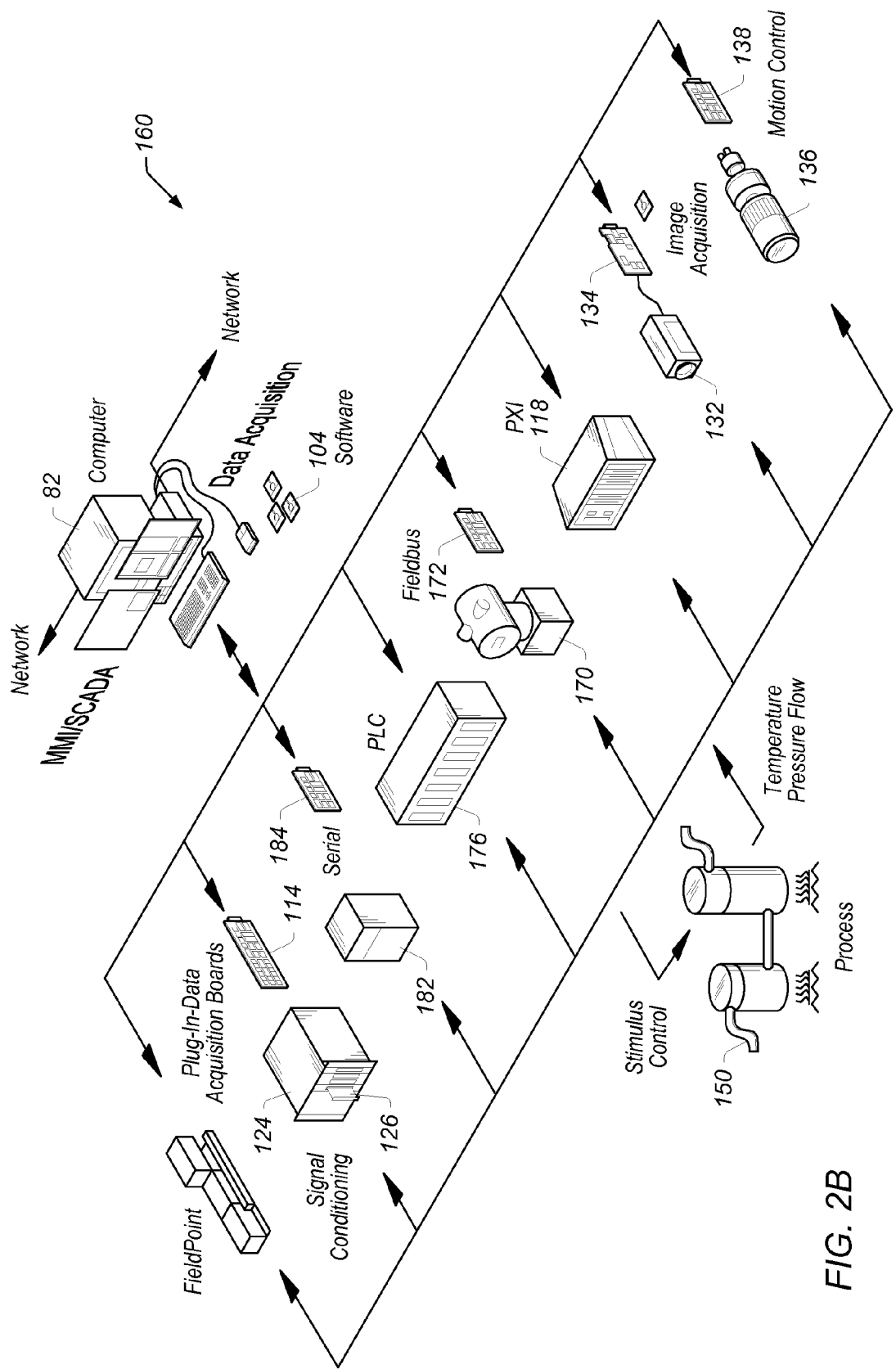
FIG. 2B illustrates an industrial automation system according to one embodiment of the invention.

FIGS. 2A and 2B

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

In the embodiments of FIGS. 2A and 2B, one or more of the various devices may couple to each other over a network, such as the Internet. In one embodiment, the user operates to select a target device from a plurality of possible target devices for programming or configuration using a graphical program. For example, one or more of the devices may be reconfigurable and may include a programmable hardware element. A graphical program may be converted to a hardware configuration program for configuring the programmable hardware element. Thus, the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

FIG. 3—Flowchart

Figure 3:
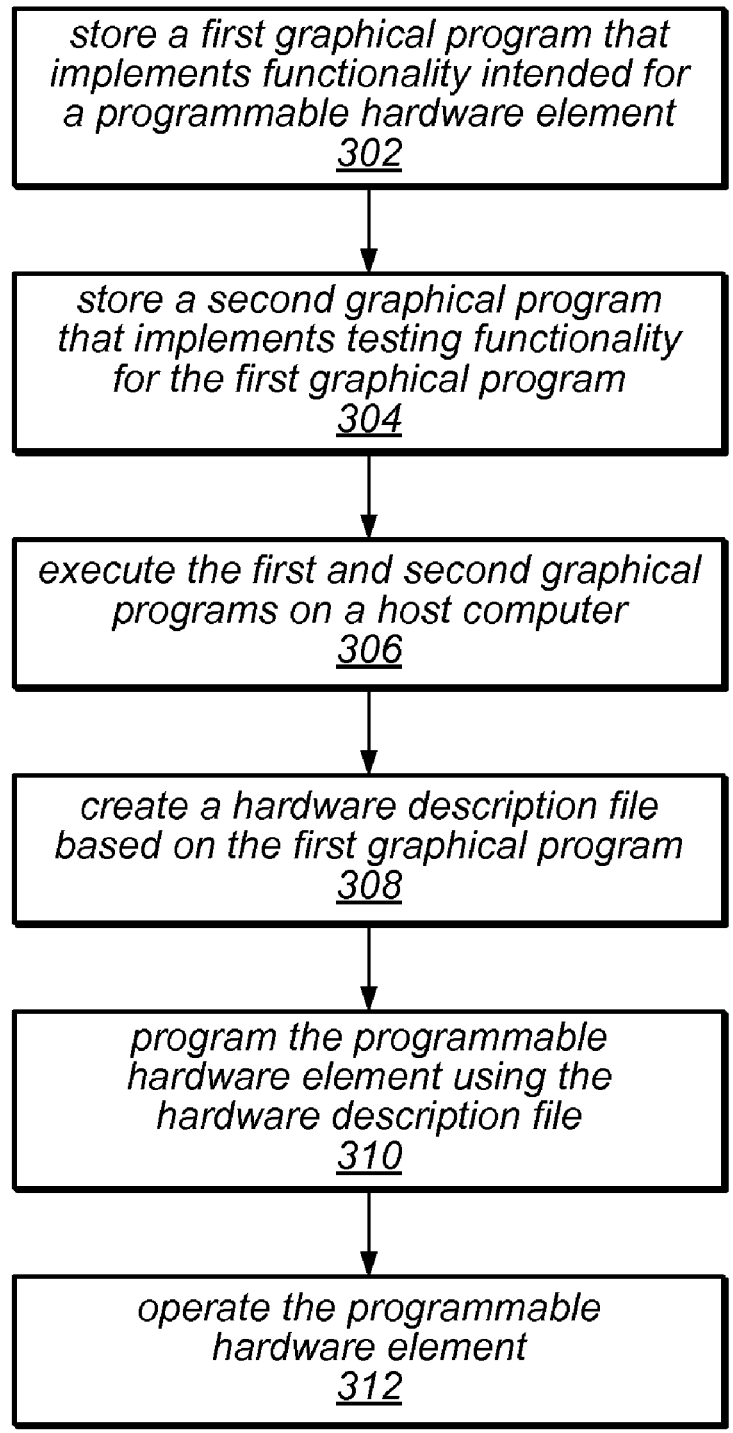
FIG. 3 is a flowchart diagram illustrating one embodiment testing a graphical program intended for implementation on a programmable hardware element.

FIG. 3 illustrates a method for testing a graphical program intended for implementation on a programmable hardware element. The method shown in FIG. 3 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 302, a first graphical program may be stored. The first graphical program may implement functionality intended for a programmable hardware element. More specifically, the first graphical program may include a first plurality of interconnected nodes (nodes connected by lines or wires, e.g., where the wires indicate data flow among the nodes). The first graphical program may visually specify or represent the functionality intended for the programmable hardware element (or functionality intended to be implemented by a device including the programmable hardware element). Various embodiments of reconfigurable devices (as well as feedthrough testing) are described in U.S. Pat. No. 7,024,660, titled "Debugging a Program Intended to Execute on a Reconfigurable Device Using a Test Feed-Through Configuration", which is hereby incorporated by reference in its entirety as though fully and completely set forth herein.

In various embodiments, the first graphical program may have been previously created, or may be created in 302. For example, the first graphical program may be created on the computer system 82 (or on a different computer system). The first graphical program may be created or assembled by the user arranging on a display a plurality of nodes or icons and then interconnecting the nodes to create the first graphical program. In response to the user assembling the first graphical program, data structures may be created and stored which represent the first graphical program. The nodes may be interconnected in one or more of a data flow, control flow, or execution flow format. The first graphical program may thus comprise the first plurality of interconnected nodes or icons which visually indicates the functionality of the program (intended for implementation on the programmable hardware element). As noted above, the first graphical program may comprise a block diagram and may also include a user interface portion or front panel portion. In some embodiments, when the block diagram is implemented on the programmable hardware element, the user interface portion may concurrently execute on the host computer. Where the first graphical program includes a user interface portion, the user may optionally assemble the user interface on the display. As one example, the user may use the LabVIEW graphical programming development environment to create the first graphical program.

In an alternate embodiment, the first graphical program may be created by the user creating or specifying a prototype, followed by automatic or automatic creation of the first graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The first graphical program may be created in other manners, either manually by the user or automatically, as desired. The first graphical program may implement a measurement function that is desired to be performed by the programmable hardware element (or the device including the programmable hardware element).

In 304, a second graphical program may be stored. The second graphical program may implement testing functionality for the first graphical program. More specifically, the second graphical program may include a second plurality of nodes connected by lines that visually specify or indicate testing functionality for the first graphical program. For example, the second graphical program may be executable by the host computer to simulate input to the programmable hardware element when configured by the first graphical program. Thus, for testing purposes, the second graphical program may provide simulated or emulated inputs for the first graphical program. The second graphical program may emulate various types of input for the first graphical program. For example, the programmable hardware element may be intended for use with various measurement cartridges or devices, and the second graphical program may simulate or emulate input from those devices. Additionally, the second graphical program may provide response to various outputs from the first graphical program, thus providing feedback to the first graphical program. Further embodiments are envisioned where the second graphical program provides further testing capabilities in addition to provision of input, feedback from output, etc.

The second graphical program may have already been created or may be created automatically or manually similar to embodiments described above regarding the first graphical program. However, in some embodiments, the first graphical program may be analyzed and the second graphical program may be automatically created based on the analysis of the first graphical program, similar to descriptions provided in U.S. patent application Ser. No. 09/587,682, which was incorporated by reference above.

In one embodiment, the second graphical program may be not be fully specified during automatic creation, but a template graphical program may be generated (or chosen) for further specification by the user. As one example, analysis of the first graphical program may reveal that inputs from a temperature gauge may be required for a first input and image data from a camera may be required for a second input. Accordingly, the template for the second graphical program may include outputs formatted for temperatures and image data respectively. Alternatively, or additionally, the second graphical program may be automatically created to include sample temperature data or the ability to generate temperature data (e.g., using various formulas specified by the interconnected nodes of the second graphical program). The user may then modify or augment the second graphical program (e.g., following the example above, to include appropriate temperature data or images from previous tests or simulations, among other possibilities). Thus, the second graphical program may be created (e.g., automatically or manually) for testing the first graphical program, e.g., to simulate operation of the programmable hardware element when programmed according to the first graphical program.

In 306, the first and second graphical programs may be executed (e.g., on a host computer). As indicated above execution of the first and second graphical program may be performed in order to test the first graphical program using execution of the second graphical program (e.g., to simulate or emulate inputs to the first graphical program). Thus, the first graphical program may be tested and/or debugged on the host computer rather than performing the typically lengthy process (e.g., several hours) of converting the first graphical program to a hardware configuration program, configuring the programmable hardware element, and performing testing on the programmable hardware element. Additionally, no physical hardware (other the host computer) may be required for this execution, thus allowing testing of the first program without requiring the physical hardware. This may be especially convenient when the developers are in a distant location from the hardware.

During execution, the output (and possibly values of various variables or functions) of the first graphical program may be monitored. For example, monitoring the output (or other operational characteristics) may include logging data (e.g., output values) of the first graphical program. Monitoring the output may include analyzing the output and displaying one or more alerts on the display of the host computer to the user. In one embodiment, the output may be analyzed in a live or real time fashion (e.g., concurrent to execution or reception of the data) or after the data is received (e.g., by analyzing logged data). The user may indicate certain conditions for when an alert should be displayed, or may indicate which variables to "watch" (e.g., as in debugging). In general, the user may be allowed to perform any of various debugging procedures known by those of skill in the art during execution of the first and second graphical program. For example, various embodiments of debugging a graphical program are described in U.S. Pat. Nos. 7,302,675, 6,584,601, and 5,652,909, which were incorporated by reference in their entirety above. In one embodiment, a front panel (e.g., as specified by the user) of the first and/or second graphical program may be used to display results (e.g., live data) from the first graphical program to the user. Further embodiments for monitoring the execution of the first and/or second graphical programs are envisioned.

In some embodiments, the second graphical program may be augmented by a third graphical program which may include a third plurality of interconnected nodes which visually specify testing of the first graphical program (or the functionality thereof). In some embodiments, the second graphical program may be for providing a first set of inputs of the first graphical program and the third graphical program may be for providing a second set of inputs of the first graphical program. Thus, the second and third graphical programs may be utilized to fully test the first graphical program. Note that this can be expanded to any number of graphical programs (e.g., one for each input, among other possibilities).

In 308, (e.g., after testing is completed) a hardware configuration program (also referred to as a hardware description file) may be created based on the first graphical program. Various embodiments for generating the hardware configuration program from a first graphical program are described in U.S. Pat. No. 6,219,628 titled "System and Method for Configuring an Instrument to Perform Measurement Functions Utilizing Conversion of Graphical Programs into Hardware Implementations," which was incorporated by reference in its entirety above.

In 310, the programmable hardware element may be programmed or configured using the hardware configuration program.

In 312, the programmable hardware element (or the device comprising the programmable hardware element) may be operated. The programmable hardware element may operate according to the functionality specified by the first graphical program.

FIGS. 4-12—Exemplary Screen Shots

FIGS. 4-12 are exemplary screen shots corresponding to the method described above. Note that these are provided as examples only and are not intended to limit the scope of the method of FIG. 3.

Figure 4:
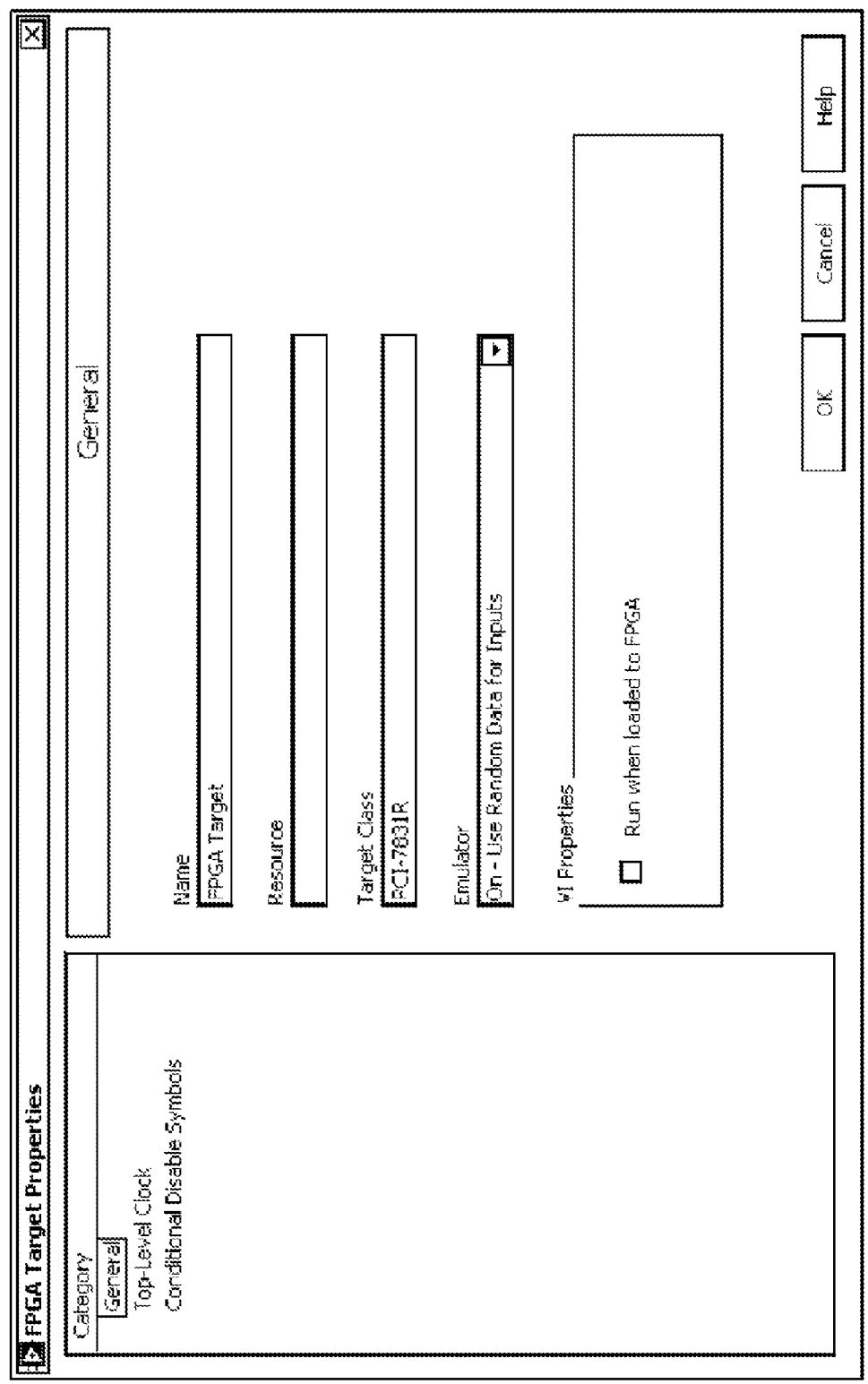
FIGS. 4-12 are exemplary screenshots corresponding to the method of FIG. 3.

As shown in FIG. 4, an exemplary property window of a programmable hardware element is shown (in this case, an FPGA). In this case there is an emulator drop down box, which current is set to "On—Use Random Data for Inputs". Thus, the programmable hardware element may be provided random data for this type of setting. However, other options, such as those available according to the method above may be chosen, such as selecting a graphical program (also referred to as a virtual instrument or VI, below). In one embodiment, the emulator option may be removed from this properties page entirely. As also shown, the user may provide a name (currently assigned to "FPGA target"), a resource, a target-class (currently assigned to "PCI-7831R"), and other properties (e.g., a checkbox to run the VI when loaded to the FPGA).

Figure 5:
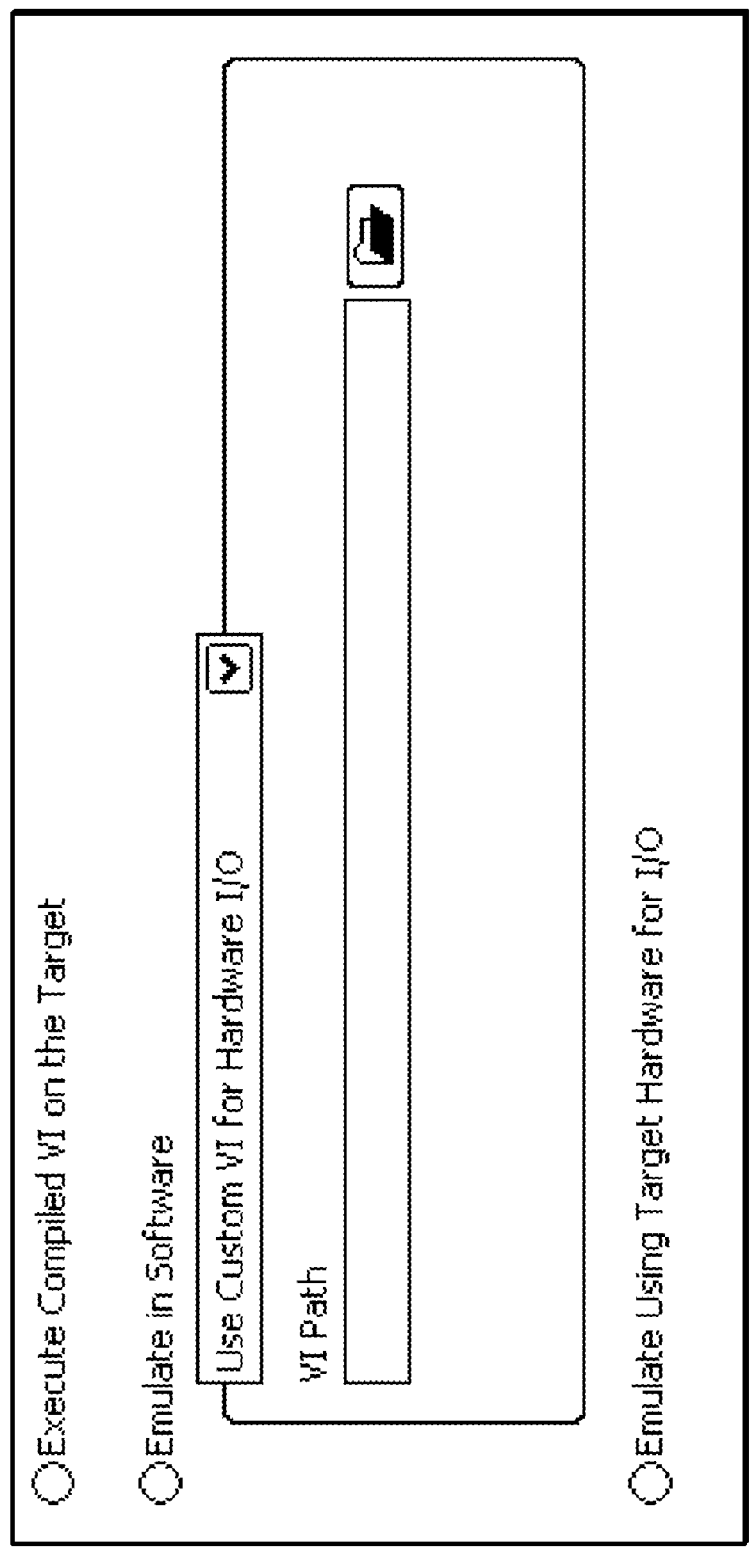

FIG. 5 is an exemplary screen shot where the user may choose various options for a VI intended for execution on a programmable hardware element (referred to below as FPGA VI). As shown, the user may select "execute compiled VI on the Target" (in this case an FPGA), "emulate in Software" where the user may select "Use Custom VI for Hardware I/O" and choose a graphical program for testing (referred to as testing VI below), or "Emulate Using Target Hardware for I/O". Under the drop down menu for "Emulate in Software" the user may still have the choice of "Use Random Data for Hardware Inputs". Note that if the user selects or specifies a testing VI path which points to a non-existent VI or incompatible VI (e.g., does not provide the correct number of inputs and/or proper types of inputs), emulation may report an error (e.g., in a dialog box or portion of the graphical programming environment) the first time an attempt is made to call the specified VI. Alternatively, the specified testing VI may be checked for compatibilities when selected. Other embodiments are envisioned. Additionally, it should be noted that these various options may be enabled via other configuration panels, e.g., using a right click menu, possibly in the graphical program intended for implementation on the programmable hardware element.

Figure 6:
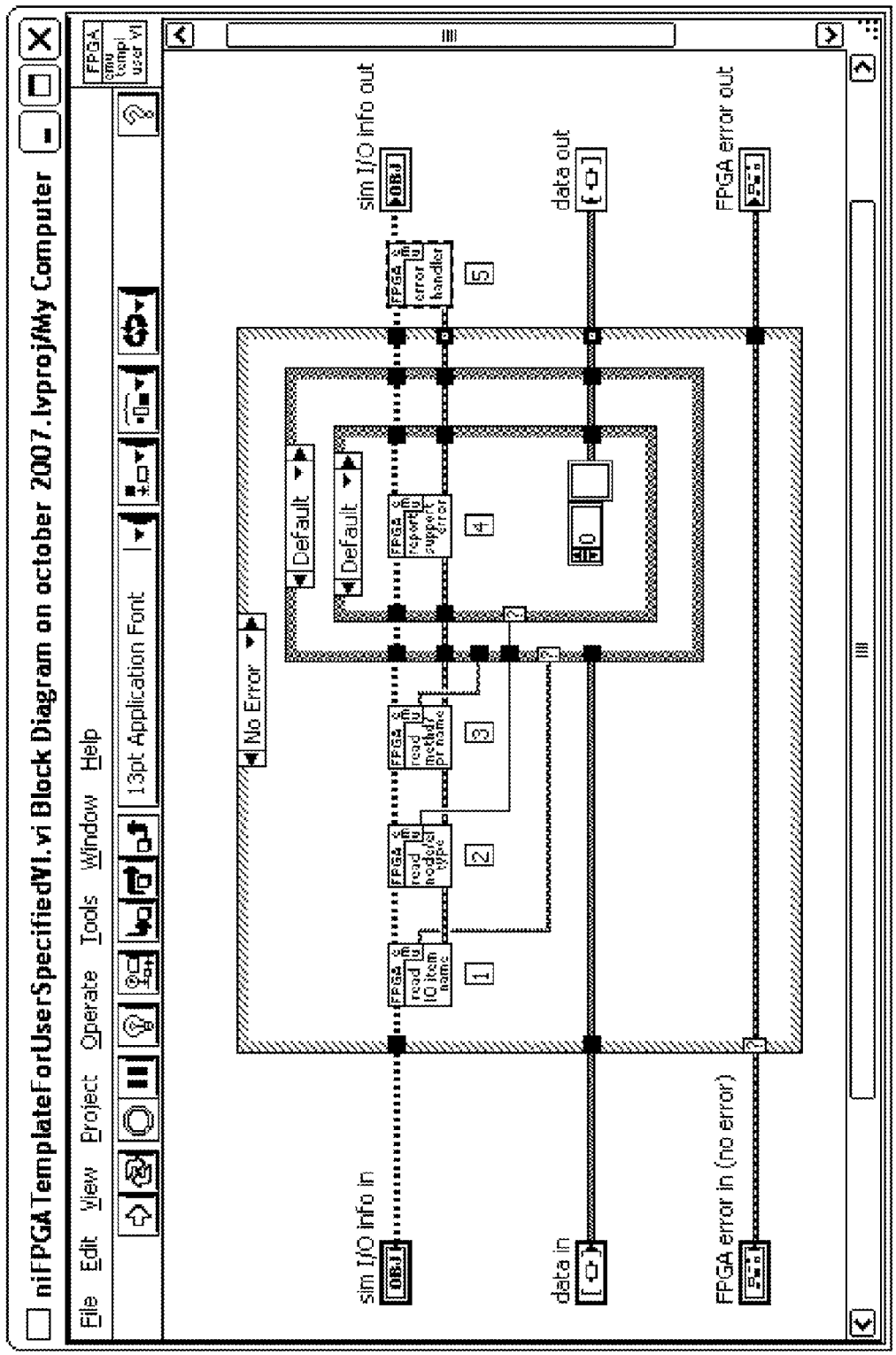

FIG. 6 is an exemplary template testing VI that a user may start with to fully specify the testing VI. The template testing VI of FIG. 6 may allow the user to control values coming from I/O, Method, and Property nodes, and to observe values going into those nodes. However, it should be noted that the template may be extended to allow for different kinds of nodes, e.g., related to I/O, in addition to those described herein. The default cases in the outer case structure shown (the box labeled "No Error" (which is the current case) may be cloned for each I/O item that should be emulated. Cases may be added to the inner case structures (labeled "Default" cases) for each read/write, method, and property read/write the user wishes to emulate on those I/O items. The subVIs labeled 1-5 may perform the following function: 1—returns the name of the I/O item in the project, 2—returns the name of the node type (Read I/O, Write I/O, Method, Read Property, Write Property), 3—Returns the name of the method or property, 4—reports that the user has not specified behavior for certain I/O items, node types, and/or method/properties, and 5—passes any emulation error to FPGA VI, so that the error is reported to the user in an appropriate fashion. As also shown, the testing VI may receive data in and FPGA error in and provide data out and FPGA error out, as well as sim I/O info. Note that the testing VI may need to be reentrant; otherwise, it may be impossible to support methods that block, such as wait on rising edge, and have other code execute in parallel. A reentrant VI is a VI that two or more callers (e.g., VIs which reference the reentrant VI) can call (cause to execute) at or near the same time, e.g., resulting in concurrent execution of the same VI.

Thus, the user may add logic and emulation support VIs to the testing VI. As shown, the template testing VI of FIG. 6 may include emulation support VIs (those labeled 1-5 above, among other possibilities). However, these VIs may be available in various palettes for the user to drag onto the testing VI or via other methods. In some embodiments, data in and data out variables may be of the data type variant (e.g., may be able to receive and provide data from various data types). Additionally, it should be noted that the testing VI may be a graphical program class that the user may specify and/or modify. Further, the user may be able to choose among a plurality of different graphical programs (e.g., in a library or a set of classes) for the user to select which VI to customize or modify for testing. However, as indicated above, the template may be automatically chosen, or the entire testing VI may be automatically generated based on the FPGA VI.

FIGS. 7-12 provide examples of various emulation support subVIs for testing VIs. However, different variations and graphical appearances are envisioned. In some embodiments, a class menu may be allowed for insertion of class members onto the wires shown, e.g., using an insert menu option.

Figure 7:
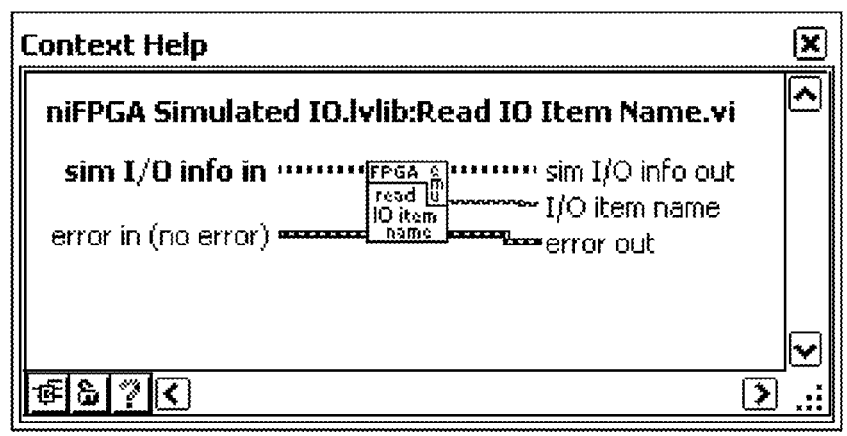

FIG. 7 is an exemplary Read I/O Item Name subVI (corresponding to 1 in FIG. 6). As shown, the node may receive sim I/O info in and error in and provide sim I/O info out, I/O item name, and error out.

Figure 8:
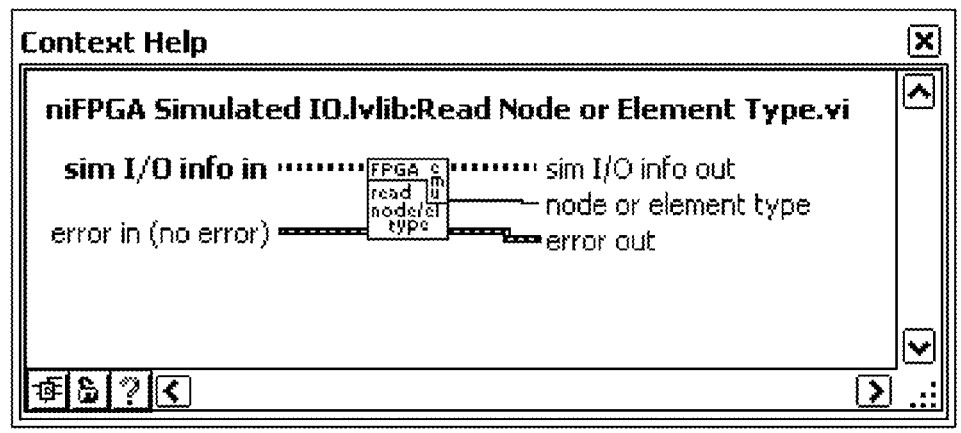

Similarly, FIG. 8 is an exemplary read node or element type subVI (corresponding to 2 in FIG. 6), which may receive sim I/O info in and error in and provide sim I/O info out, the node or element type, and the error out. The node or element type output may be an enum with the possible values: Read I/O, Write I/O, Method, Read Property, and/or Write Property.

Figure 9:
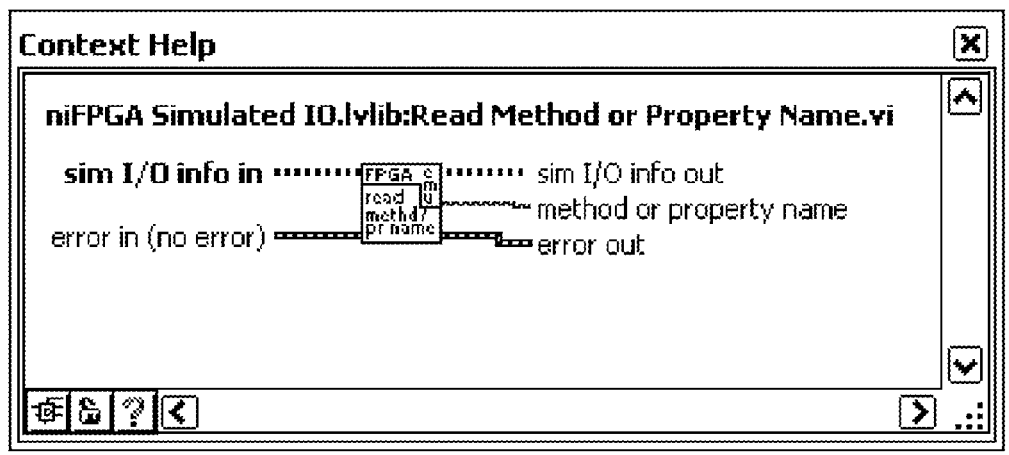

FIG. 9 is a read method or property name subVI (corresponding to 3 in FIG. 6), which may receive sim I/O info in and error in and provide sim I/O info out, the method or property name, and the error out.

Figure 10:
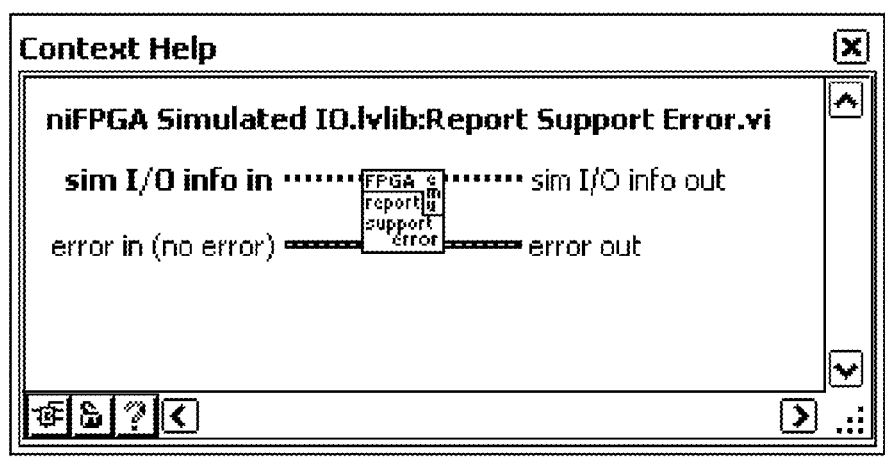

FIG. 10 is a report support error subVI (corresponding to 4 in FIG. 6), which may receive sim I/O info in and error in and provide sim I/O info out and error out.

Figure 11:
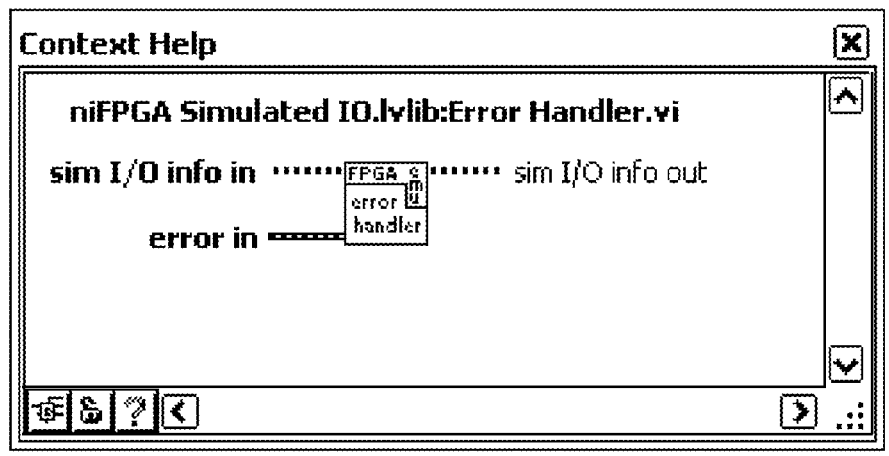

FIG. 11 is an FPGA Emulation Error Handler subVI (corresponding to 5 in FIG. 6), which may receive sim I/O info in and error in and provide sim I/O info out.

Figure 12:
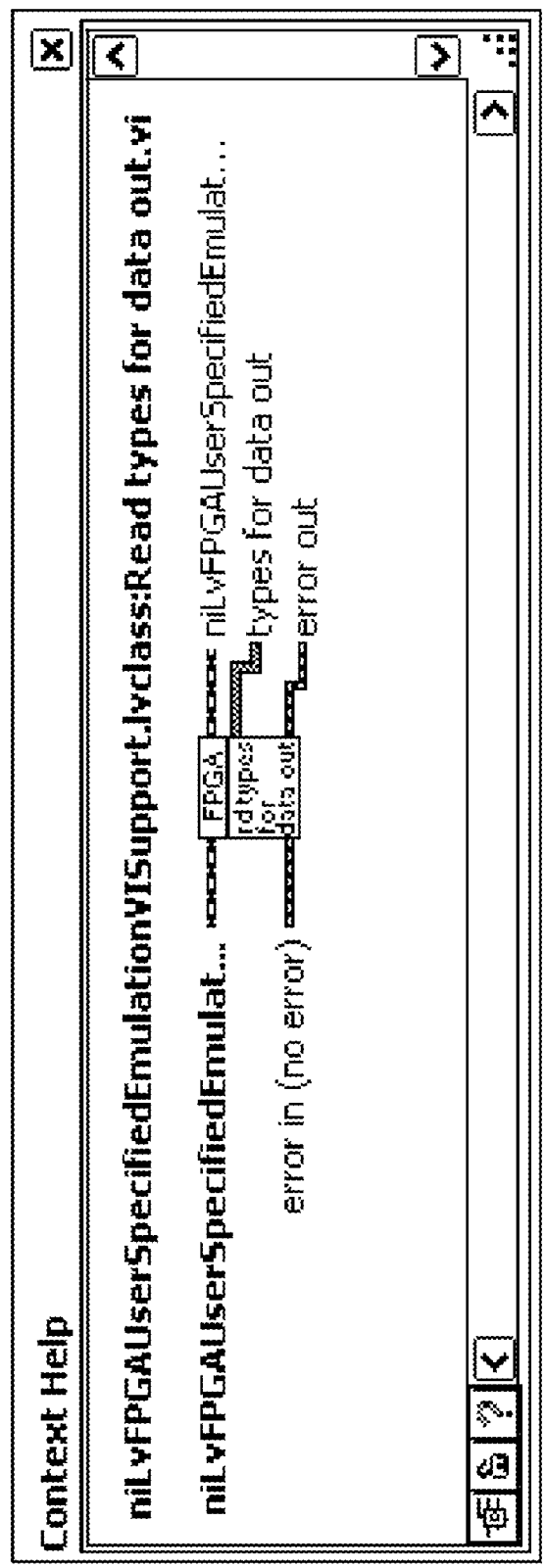

Finally, FIG. 12 is a read types for data out subVI, which may provide types for data out. Additional subVIs may include "read device or resource name", among other possibilities.

FIGS. 13A-13E—Exemplary Walkthrough

FIGS. 13A-13E are exemplary screen shots corresponding to a walkthrough of the method described above. More specifically, these screenshots illustrate creation of the first graphical program, the second graphical program, and testing and debugging of the first graphical program using the second graphical program on a host computer. These Figures illustrate use of the graphical programming development environment LabVIEW provided by National Instruments Corp. Note that these are provided as examples only and are not intended to limit the scope of the method of FIG. 3.

Creating an FPGA VI to Test

Figure 13A:
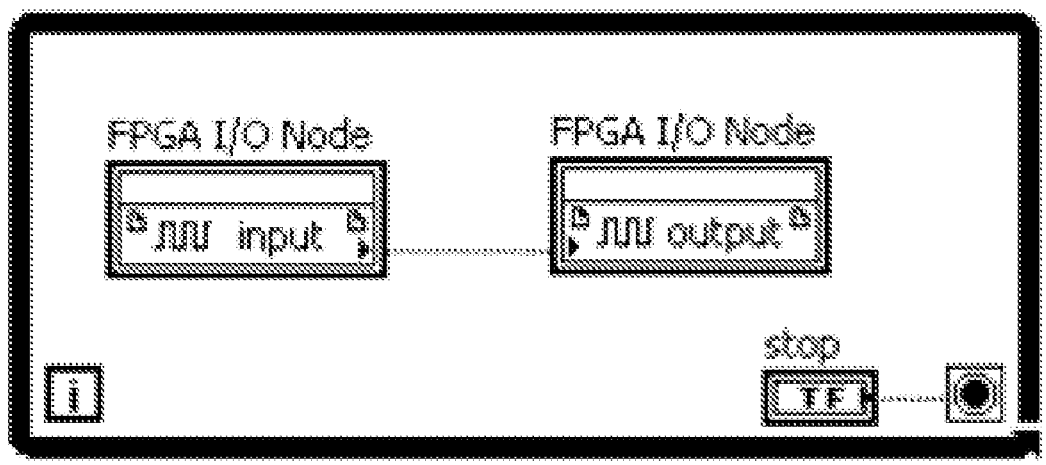
FIGS. 13A-13E are exemplary screenshots of a walk through corresponding to the method of FIG. 3.

1. Create a LabVIEW project and save the project as inverter.lvproj.
2. Add an FPGA target to the project.
3. Right-click the FPGA target and select New→VI from the shortcut menu to create a new FPGA VI.
4. Save the FPGA VI as "Inverter.vi" (hereon referred to as "Inverter VI".
5. Create two digital FPGA I/O items called input and output, respectively.
6. Drag the FPGA I/O items from the Project Explorer window to the block diagram of the Inverter VI to create corresponding FPGA I/O Nodes.
7. Right-click output on the FPGA I/O Node and select "Change to Write" from the shortcut menu.
8. Place the FPGA I/O Nodes within a While loop and wire the nodes together, as shown in the block diagram of FIG. 13A. Note that while the purpose of the Inverter VI is to read a digital line, invert the value, and write the inverted value to another digital line, the current block diagram of FIG. 13A is missing a "not" function between the two FPGA I/O Nodes.

Testing the FPGA VI on the Development Computer with a Custom VI

Figure 13B:
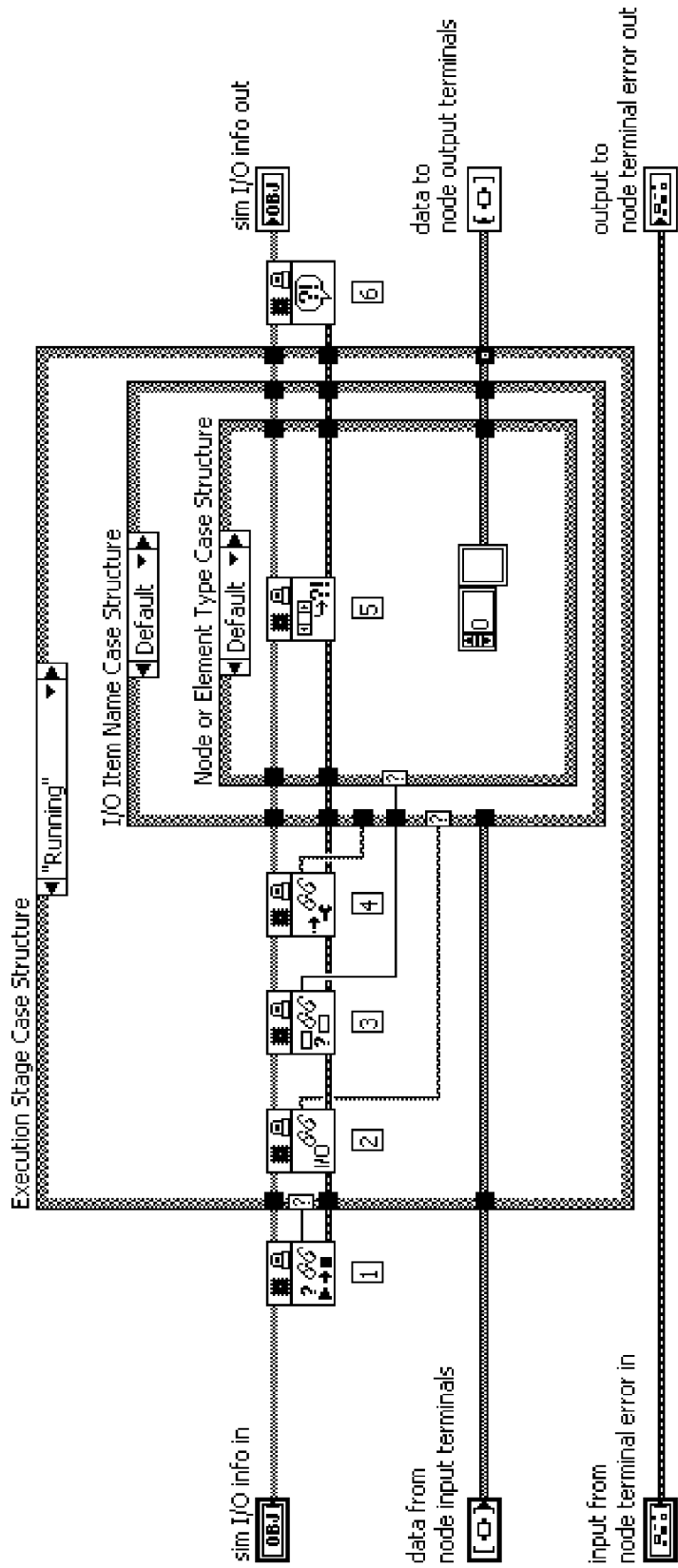
Figure 13C:
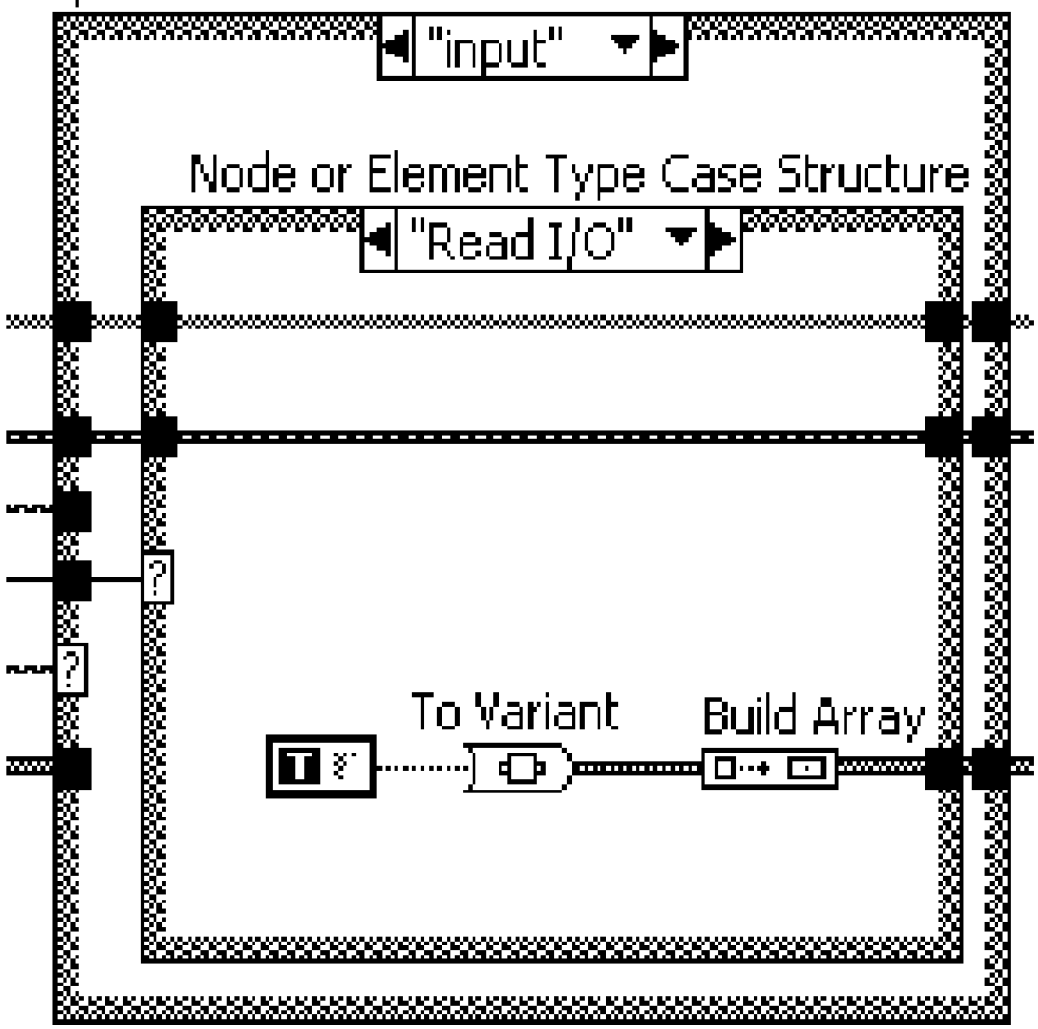
Figure 13D:
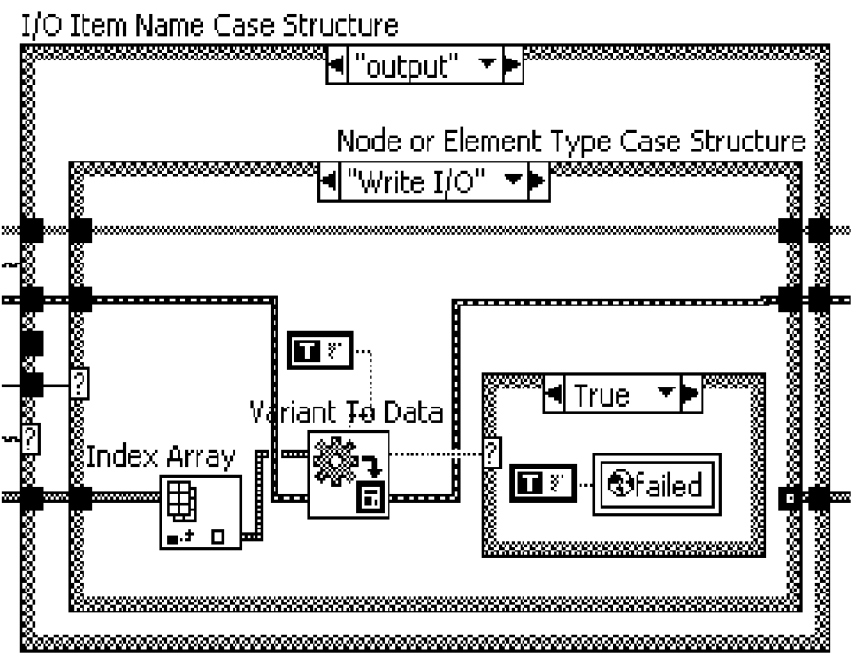
Figure 13E:
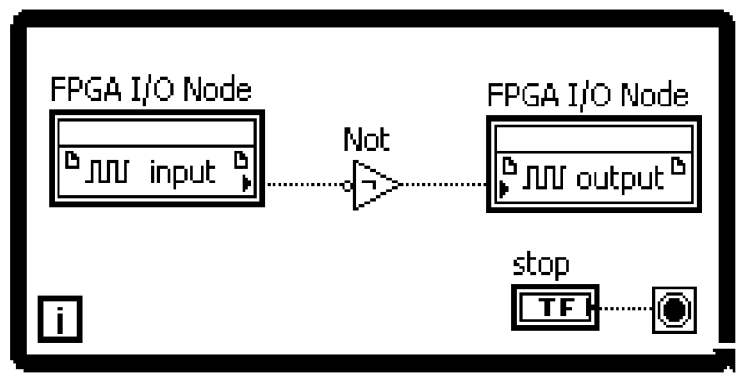

1. In the Debugging Properties page, select "Use Custom VI for FPGA I/O from the "Execute VI on Development Computer with Simulated I/O" pull-down menu.
2. Click the "New VI from Template" button and save the custom VI as "Simulated IO for Inverter.vi" (hereon referred to as Simulated IO for Inverter VI).
3. Click the "Add" button in the dialog that asks if you want to add the VI to the current project. Notice that LabVIEW adds the custom VI under "My Computer" in the project.
4. Open the block diagram of the Simulated IO for Inverter VI. The block diagram of the Simulated IO for Inverter VI is shown in FIG. 13B.
5. Right-click the "I/O Item Name" Case structure and select "Duplicate Case" from the shortcut menu.
6. Enter "input" in the selector label. The input case executes when the FPGA VI calls the FPGA I/O Node for the input I/O item.
7. Right-click the "Node or Element Type" Case structure and select "Duplicate Case" from the shortcut menu. Notice that the "Read I/O" case is selected. This case executes for the FPGA I/O Node configured to read the input I/O item.
8. Delete the "Read Support Error" VI from the case and wire "sim I/O info in" and "error out" through the case structure.
9. Replace the empty array with a "True constant, To Variant" function and "Build Array" function as shown in the block diagram of FIG. 13C.
10. Run the Inverter VI. Notice that the probe on the wire between the two FPGA I/O Nodes indicates a value of "True" because a True constant is included in the Simulated IO for Inverter VI. LabVIEW also returns an error message indicating that you did not specify behavior for the FPGA I/O Node configured for the output I/O item.

Testing the Output I/O Item

1. In the "Project Explorer" window, select "My Computer" and then select File→New to display the "New" dialog box.
2. Select "Global Variable" from the "Other Files" folder to create a new global VI.
3. Save the global VI as "Test Bookkeeping.vi" (hereon referred to as "Test Bookkeeping VI".
4. Add a Boolean indicated called "failed" to the front panel of the Test Bookkeeping VI. The "failed" indicator is a global variable.

5. On the block diagram of the Simulated IO for Inverter VI, right-click the "input" case of the "IO Item Name" case structure and select "Duplicate Case" from the shortcut menu. Name the case as "output".

6. In the "Node or Element Type" Case structure, select the "Read I/O" case, double-click the selector, and enter "Write I/O". This case executes for the FPGA I/O Node for the output I/O item.

7. Delete the code that goes to the array of variants tunnel and add the "Index Array" function, "Variant to Data" function, and a case structure with the "failed" global variable, as shown in the block diagram of FIG. 13D. Because the value of the input I/O item is specified as "True", the value of the Inverter VI writes to the output I/O item should be "False", if the code in the Inverter VI is correct. Accordingly, the test fails if the Inverter VI ever writes "True" to the output I/O item.

8. Run the Inverter VI and monitor the Test Bookkeeping VI. Notice the "failed" indicator is true, indicating that the test failed.

9. Stop the Inverter VI.

10. To fix the problem in the Inverter VI, add a Not function as shown in the block diagram of FIG. 13E.

11. In the Test Bookkeeping VI, right-click the "failed" indicator and select "Data Operations"→"Reinitialize to Default Value" from the shortcut menu. Now, when the Inverter VI is run, the "failed" indicator remains false, indicating that the test is not failing.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for testing a first graphical program intended for implementation on a programmable hardware element comprising:
storing the first graphical program in a memory, wherein the first graphical program comprises a first plurality of nodes connected by lines, wherein the first plurality of nodes connected by lines visually specify first functionality, wherein the first graphical program is intended for deployment on the programmable hardware element;
storing a second graphical program in the memory, wherein the second graphical program comprises a second plurality of nodes connected by lines, wherein the second plurality of nodes connected by lines visually specify testing functionality for the first graphical program, wherein the second graphical program is executable by a processor of a host computer to simulate input to the first graphical program as though it were deployed on the programmable hardware element; and
executing, on the processor of the host computer, the first graphical program and the second graphical program to test the first functionality as though deployed on the programmable hardware element.

2. The method of claim 1, further comprising:
creating a hardware configuration program based on the first graphical program; and
programming the programmable hardware element using the hardware configuration program.

3. The method of claim 2, further comprising:
operating the programmable hardware element, wherein the programmable hardware element implements the first functionality.

4. The method of claim 1, further comprising:
monitoring output of the first graphical program during said executing.

5. The method of claim 4, wherein said monitoring comprises logging output data from the output of the first graphical program.

6. The method of claim 4, wherein said monitoring comprises analyzing the output from the first graphical program.

7. The method of claim 6, further comprising:
displaying one or more alerts on a display based on said analyzing.

8. The method of claim 1, further comprising:
storing a third graphical program for testing the first functionality of the first graphical program;
wherein said executing comprises executing the third graphical program with the first and second graphical programs.

9. The method of claim 1, further comprising:
automatically generating the second graphical program based on the first graphical program.

10. A non-transitory computer accessible memory medium storing program instructions for testing a first graphical program intended for implementation on a programmable hardware element, wherein the program instructions are executable to:
store the first graphical program, wherein the first graphical program comprises a first plurality of nodes connected by lines, wherein the first plurality of nodes connected by lines visually specify first functionality, wherein the first graphical program is intended for implementation on the programmable hardware element;
store a second graphical program, wherein the second graphical program comprises a second plurality of nodes connected by lines, wherein the second plurality of nodes connected by lines visually specify testing functionality for the first graphical program, wherein the second graphical program is executable by a host computer to simulate input to the first graphical program as though it were implemented on the programmable hardware element; and
execute, on the host computer, the first graphical program and the second graphical program to test the first functionality as though implemented on the programmable hardware element.

11. The non-transitory computer accessible memory medium of claim 10, wherein the program instructions are further executable to:
create a hardware configuration program based on the first graphical program; and
program the programmable hardware element using the hardware configuration program.

12. The non-transitory computer accessible memory medium of claim 11, wherein the program instructions are further executable to:
initiate operation of the programmable hardware element, wherein the programmable hardware element implements the first functionality.

13. The non-transitory computer accessible memory medium of claim 10, wherein the program instructions are further executable to:
monitor output of the first graphical program during said executing.

14. The non-transitory computer accessible memory medium of claim 13, wherein said monitoring comprises logging output data from the output of the first graphical program.

15. The non-transitory computer accessible memory medium of claim 13, wherein said monitoring comprises analyzing the output from the first graphical program.

16. The non-transitory computer accessible memory medium of claim 15, wherein the program instructions are further executable to:
 display one or more alerts on a display based on said analyzing.

17. The non-transitory computer accessible memory medium of claim 10, wherein the program instructions are further executable to store a third graphical program for testing the first functionality of the first graphical program and execute the third graphical program with the first and second graphical programs.

18. The non-transitory computer accessible memory medium of claim 10, wherein the program instructions are further executable to:
 automatically generate the second graphical program based on the first graphical program.

19. A system comprising:
 a processor; and
 a memory medium coupled to the processor, wherein the memory medium stores program instructions for testing a first graphical program intended for implementation on a programmable hardware element, wherein the program instructions are executable by the processor to:
  store the first graphical program, wherein the first graphical program comprises a first plurality of nodes connected by lines, wherein the first plurality of nodes connected by lines visually specify first functionality, wherein the first graphical program is intended for implementation on the programmable hardware element;
  store a second graphical program, wherein the second graphical program comprises a second plurality of nodes connected by lines, wherein the second plurality of nodes connected by lines visually specify testing functionality for the first graphical program, wherein the second graphical program is executable by a host computer to simulate input to the first graphical program as though it were implemented on the programmable hardware element; and
  execute, on the host computer, the first graphical program and the second graphical program to test the first functionality as though implemented on the programmable hardware element.

20. The system of claim 19, wherein the system further comprises the programmable hardware element, and wherein the program instructions are further executable to:
 create a hardware configuration program based on the first graphical program; and
 program the programmable hardware element using the hardware configuration program.

\* \* \* \* \*